(12) United States Patent
Shishkin et al.

(10) Patent No.: US 10,048,413 B2
(45) Date of Patent: Aug. 14, 2018

(54) IMAGING SYSTEMS AND METHODS

(71) Applicant: Goodrich Corporation, Charlotte, NC (US)

(72) Inventors: Serge L. Shishkin, Marlborough, CT (US); Hongcheng Wang, Falls Church, VA (US); Alan M. Finn, Hebron, CT (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 15/175,877

(22) Filed: Jun. 7, 2016

(65) Prior Publication Data
US 2017/0351012 A1    Dec. 7, 2017

(51) Int. Cl.
| | |
|---|---|
| *G02B 13/16* | (2006.01) |
| *H04N 5/225* | (2006.01) |
| *G02B 5/20* | (2006.01) |
| *G02B 5/30* | (2006.01) |
| *H04N 9/04* | (2006.01) |
| *H04N 5/345* | (2011.01) |

(52) U.S. Cl.
CPC ............... *G02B 5/20* (2013.01); *G02B 5/30* (2013.01); *H04N 5/2254* (2013.01); *H04N 5/3456* (2013.01); *H04N 9/045* (2013.01); *H04N 2209/045* (2013.01)

(58) Field of Classification Search
CPC ...................................... H04N 5/2254
USPC ................................. 348/272, 335
See application file for complete search history.

(56) References Cited

U.S. PATENT DOCUMENTS

| | | | | |
|---|---|---|---|---|
| 5,548,333 | A * | 8/1996 | Shibazaki | H04N 5/2353 348/223.1 |
| 7,173,658 | B2 | 2/2007 | Kikuchi | |
| 8,345,144 | B1 * | 1/2013 | Georgiev | G03B 11/00 348/335 |
| 8,564,699 | B2 | 10/2013 | Alleysson et al. | |
| 8,917,327 | B1 | 12/2014 | Bishay et al. | |
| 9,467,628 | B2 * | 10/2016 | Geng | H04N 5/2355 |
| 2011/0109773 | A1 | 5/2011 | Dekel | |

(Continued)

FOREIGN PATENT DOCUMENTS

| | | |
|---|---|---|
| EP | 2 252 069 | 11/2010 |
| EP | 2899690 A2 | 7/2015 |

OTHER PUBLICATIONS

Search Report in counterpart European Patent Application No. 17174676.1-1902 dated Sep. 22, 2017.

(Continued)

*Primary Examiner* — Anthony J Daniels
(74) *Attorney, Agent, or Firm* — Locke Lord LLP; Scott D. Wofsy; Christopher J. Cillié

(57) ABSTRACT

An imaging method includes receiving electromagnetic radiation with a plurality of qualities from a scene to be captured at a mask and passing a first portion of the received electromagnetic radiation having the plurality of qualities present in the received electromagnetic radiation through the mask. One or more qualities of the received electromagnetic radiation is removed from a second portion of the received electromagnetic radiation, and the second portion of the received electromagnetic radiation absent the one or more removed qualities is passed through the mask.

15 Claims, 5 Drawing Sheets

(56) References Cited

U.S. PATENT DOCUMENTS

| | | | |
|---|---|---|---|
| 2011/0142339 A1* | 6/2011 | Singh | H04N 9/07 |
| | | | 382/166 |
| 2013/0070138 A1 | 3/2013 | Baraniuk et al. | |
| 2014/0055664 A1 | 2/2014 | Yamagata et al. | |
| 2014/0253781 A1* | 9/2014 | Gill | G02B 5/1842 |
| | | | 348/335 |
| 2014/0320843 A1* | 10/2014 | Streuber | F41G 7/008 |
| | | | 356/4.01 |
| 2015/0215529 A1 | 7/2015 | Wang | |

OTHER PUBLICATIONS

Extended European Search Report received from the European Patent Office (EPO) dated Jan. 29, 2018 for Application No. EP17174676.1.

* cited by examiner

IMAGING SYSTEMS AND METHODS

BACKGROUND OF THE INVENTION

1. Field of the Invention

The present disclosure relates to imaging systems and methods, and more particularly to collecting high resolution image data for one or more qualities of light with masked sensor arrangements. The qualities of light include intensity, wavelength, and polarization.

2. Description of Related Art

Image reconstruction is commonly used in numerous technical areas to acquire information regarding objects of interest within a background environment. As an example, surveillance aircraft commonly capture image data at multiple wavelengths, which must be reconstructed to provide information. This image data is generally captured quickly, and the accuracy, spatial resolution, and dynamic range must be as high as possible.

Image data is generally acquired using a sensor array, e.g., a camera, which may be provided with a filter. The filter typically breaks the incoming light into different levels. For example, some sensor arrays break incoming light into different intensity levels, although different spectral levels (i.e. the colors red, blue, green, for instance) may be separated by the filter. It is also known to use different filters to separate other qualities within the light, such as polarization, the result of which is that information peculiar to a given level of the quality of light and conveyed independently of other levels reaches the sensor, and is thereby selectively captured in the image data. Such filters, e.g., a Bayer filter, are generally provided in regular pattern for light in the human-visible portion of the visible spectrum.

Such conventional methods and systems have generally been considered satisfactory for their intended purpose. However, there is still a need in the art for improved filters, image sensors employing such filters, and methods of reconstructing images using image data collected by such image sensors. The present disclosure provides a solution for this need.

SUMMARY OF THE INVENTION

An imaging method includes receiving electromagnetic radiation with a plurality of qualities from a scene to be captured at a mask and passing a first portion of the received electromagnetic radiation having the plurality of qualities present in the received electromagnetic radiation through the mask. One or more qualities of the received electromagnetic radiation are removed from a second portion of the received electromagnetic radiation, and the second portion of the received electromagnetic radiation absent the one or more removed qualities is passed through the mask.

In certain embodiments, the method can include receiving the first portion of the electromagnetic radiation and the second portion of the electromagnetic radiation at a sensor array optically coupled to the mask. The method can include simultaneously passing the first portion of the electromagnetic radiation and the second portion of the electromagnetic radiation through the mask. The first portion of the electromagnetic radiation and the second portion of the electromagnetic radiation can be received at spatially separate portions of a sensor array optically coupled to the mask.

It is also contemplated that, in accordance with certain embodiments, removing the one or more qualities can include filtering the received electromagnetic radiation according to a polarization quality. The first portion can include all polarization qualities of the received electromagnetic radiation. Removing the one or more qualities can include filtering the received electromagnetic radiation according to an intensity quality. The first portion can include all intensity qualities of the received electromagnetic radiation. Removing the one or more qualities can include filtering the received electromagnetic radiation according to a spectral quality. The first portion can include all spectral qualities of the received electromagnetic radiation.

In accordance with certain embodiments, the method can include removing from a third portion of the electromagnetic radiation one or more of the plurality of qualities of the electromagnetic radiation using the mask. The third portion of the electromagnetic radiation can be passed through the mask. An image can be reconstructed using the second portion of the electromagnetic radiation and the third portion of the electromagnetic radiation based on the first portion of the electromagnetic radiation.

An imaging system includes a sensor array with a plurality of pixels and a mask optically coupled to the sensor array. The mask includes a plurality of first mask elements and a plurality of second mask elements, the plurality of first mask elements are spatially distributed among the plurality of second mask elements. The second mask elements remove one or more qualities of electromagnetic radiation received at respective second mask elements. The first mask elements pass all qualities of electromagnetic radiation received at respective first mask elements.

In embodiments, the second mask elements can remove one or more polarization quality, spectral quality, or intensity quality from received electromagnetic radiation. The mask can include equivalent numbers of first mask elements and the second mask elements, more first mask elements than second mask elements, or fewer first mask elements than second mask elements. The mask can include a plurality of third mask elements, each third mask element removing a quality from received electromagnetic different than that removed from each of the plurality of second mask elements and passed by each of the plurality of first mask elements.

A mask for an imaging system includes a plurality of first mask elements and a plurality of second mask elements distributed among the first mask elements. Each first mask element passes all qualities of electromagnetic radiation received at a respective first mask element. Each second mask element removes one or more polarization quality from electromagnetic radiation received at a respective second mask element.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
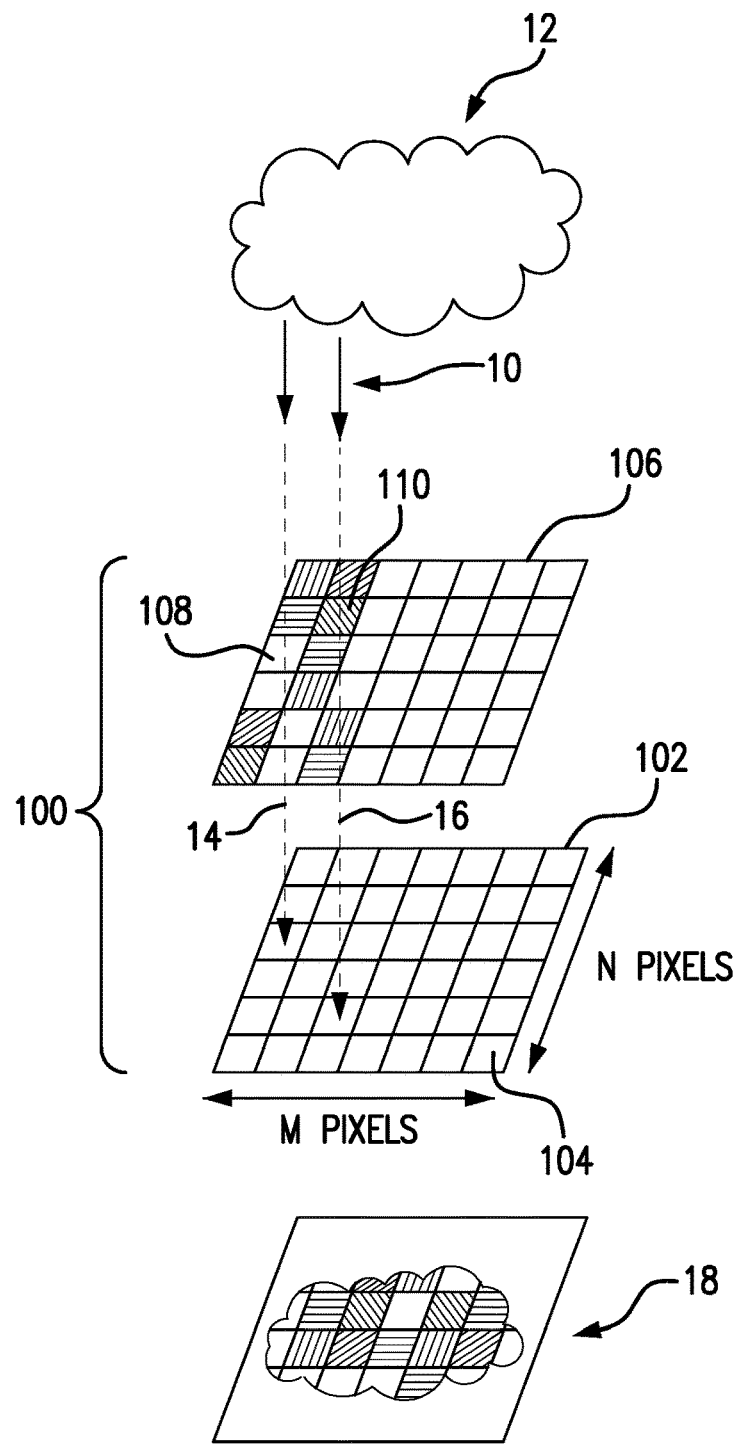
FIG. 1 is a schematic view of an exemplary embodiment of an imaging system constructed in accordance with the present disclosure, showing a mask with all-pass element optically coupled to a sensor array.

Reference will now be made to the drawings wherein like reference numerals identify similar structural features or aspects of the subject disclosure. For purposes of explanation and illustration, and not limitation, a partial view of an exemplary embodiment of an imaging system in accordance with the disclosure is shown in FIG. 1 and is designated generally by reference character 100. Other embodiments of imaging systems, image reconstruction methods, and masks for imaging systems in accordance with the disclosure, or aspects thereof, are provided in FIGS. 2-5, as will be described. The systems and methods described herein can be used for reconstructing high dynamic range, high precision, or high resolution images using joint reconstruction constrained by a spatially distributed all-polarization, full-intensity or wide-spectra image data, however the present disclosure is not limited to polarization, intensity, or spectral joint reconstruction imaging systems or methods in general.

As shown in FIG. 1, imaging system 100 includes a sensor array 102 with a plurality of pixels 104 and a mask 106. Mask 106 is optically coupled to sensor array 102 and includes a plurality of all-pass elements 108 and a plurality of filter elements 110. The plurality of all-pass elements 108 are interspersed among the plurality of filter elements 110. Each of the plurality of all-pass elements 108 are configured and adapted to pass all qualities of electromagnetic radiation 10 from a scene to be imaged 12 received at the respective all-pass element to sensor array 102. Each of the plurality of filter elements are configured and adapted to filter one or more quality of electromagnetic radiation 10 from the scene to be imaged 12. As used herein qualities of electromagnetic radiation can include, without limitation, polarization qualities, intensity qualities, and/or spectral qualities.

Mask 106 receives electromagnetic radiation and separates the received electromagnetic radiation based upon the spatial distribution of all-pass elements 108 among filter elements 110. Separation may be on the basis of qualities of light, and may include polarization, intensity level, spectral level (e.g., the colors red, blue, green, for instance), or other qualities within the light. Exemplary sensor array 102, illustrated as detached from mask 106, receives rays 14 and 16 from scene 12, filtered spatially according to the distribution of all-pass elements 108, and generates a spatially random patchwork image 18. As can be appreciated, the different qualities in the resulting images are geometrically randomly spaced, geometrically pseudo-randomly spaced, or geometrically spaced according to a particular distribution corresponding to the spatial irregularity of mask 106.

Figure 2:
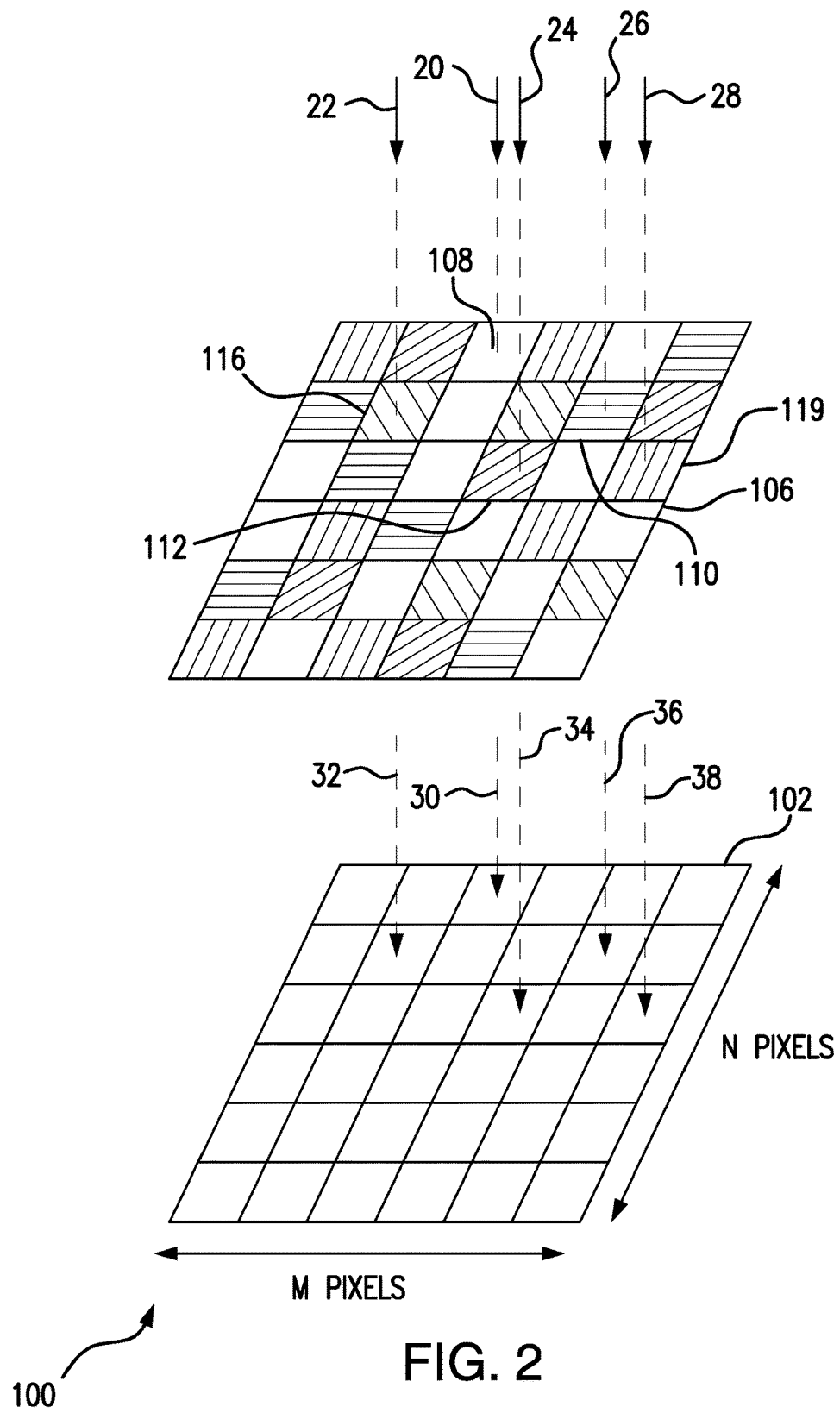
FIG. 2 is a schematic view of the imaging system of FIG. 1, schematically showing the imaging system capturing difference qualities of electromagnetic radiation for reconstructing an image of a scene to be captured.

Referring to FIG. 2 details of imaging system 100 are shown. Exemplary mask 106 is illustrated having a spatially pseudo-random plurality of all-pass elements 108, a plurality of first filter elements 110, a plurality of second filter elements 112, a plurality of third filter elements 114, and a fourth plurality of filter elements 116. Each all-pass element 108 passes all polarizations of light received at respective all-pass elements 108 to sensor array 102. Each first filter element 110 passes 0-degree polarization light received at mask 106 to sensor array 102. Each second filter element 112 passes 45-degree polarization light received at mask 106 to sensor array 102. Each third filter element 114 passes 90-degree polarization light received at mask 106 to sensor array 102. Each fourth filter element 116 passes 135-degree polarization light received at mask 106 to sensor array 102. Mask 106 is shown detached from sensor array 102 for illustration purposes; as will be appreciated mask 106 can be attached to sensor array 102. Light rays 22, 24, 26, and 28 from scene 12 are filtered by polarization filter elements 110, 112, 114, and 116 to produce filtered light rays 32, 34, 36, and 38 resulting in a patchwork image 18. Light ray 20 passes through all-pass element 108 resulting a light ray 30 containing all polarization of light. As can be appreciated, the different polarizations in the resulting images may be irregularly spaced or geometrically unordered, corresponding to the spatial irregularity of mask 106. If filter elements 32, 34, 36, and 38 comprise bandpass or bandstop filters for different wavelengths, then the resulting images are a pseudo-random patchwork by wavelength. If filter elements 32, 34, 36, and 38 comprise different attenuations, then the resulting images are a pseudo-random patchwork by intensity, etc. It will be shown that these pseudo-random patchwork images may be reconstructed into, e.g., a high precision image, with higher accuracy than previously known.

Figure 3:
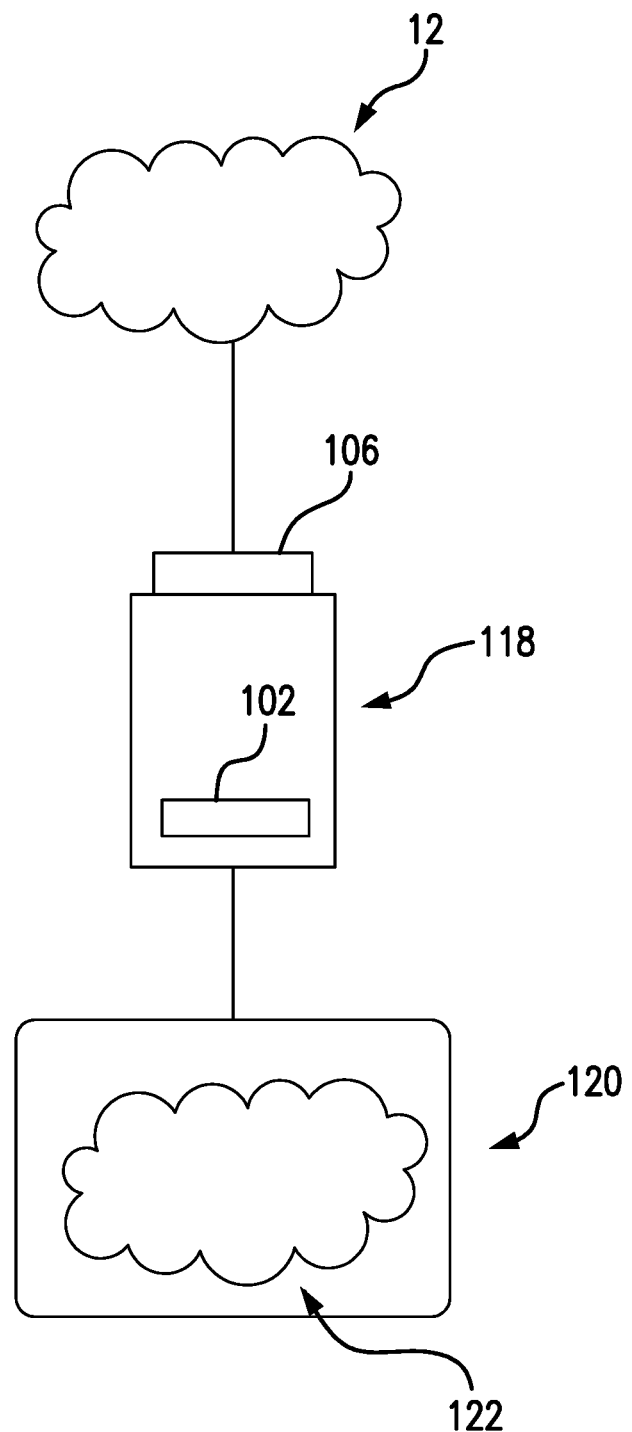
FIG. 3 is schematic view of an image reconstruction step, showing images being reconstructed using differently filtered portions of light and shared information at selected image locations.

As shown in FIG. 3, mask 106 may be associated with a sensor or camera 118 containing sensor array 102 and communicating with a processor or computer 120. Scene 12 to be captured is shown reconstructed and displayed at 122 on computer 120. The use of the pseudo-randomly ordered mask 106 with all-pass elements 108 provides benefits, as will be described below. Particularly when utilized in combination with modern reconstruction algorithms, more accurate images are provided. Communication between camera 118 and computer 120 may be a wired channel or alternatively may be any other optical, wireless, radio channel, or any other type of channel capable of transmitting images and videos between two points including links involving the World Wide Web (www) or the internet.

The pseudo-random imaging reconstruction depends critically on a mathematical property called sparsity. Sparsity is a property whereby some data, e.g., an image, may be represented by only a few non-zero numbers (also called coefficients) which multiply an appropriate set of basis functions. Natural imagery is known to be sparse because these images can be compressed (using relatively few coefficients and Fourier or Wavelet basis functions) and accurately reconstructed from these few coefficients.

Figure 4:
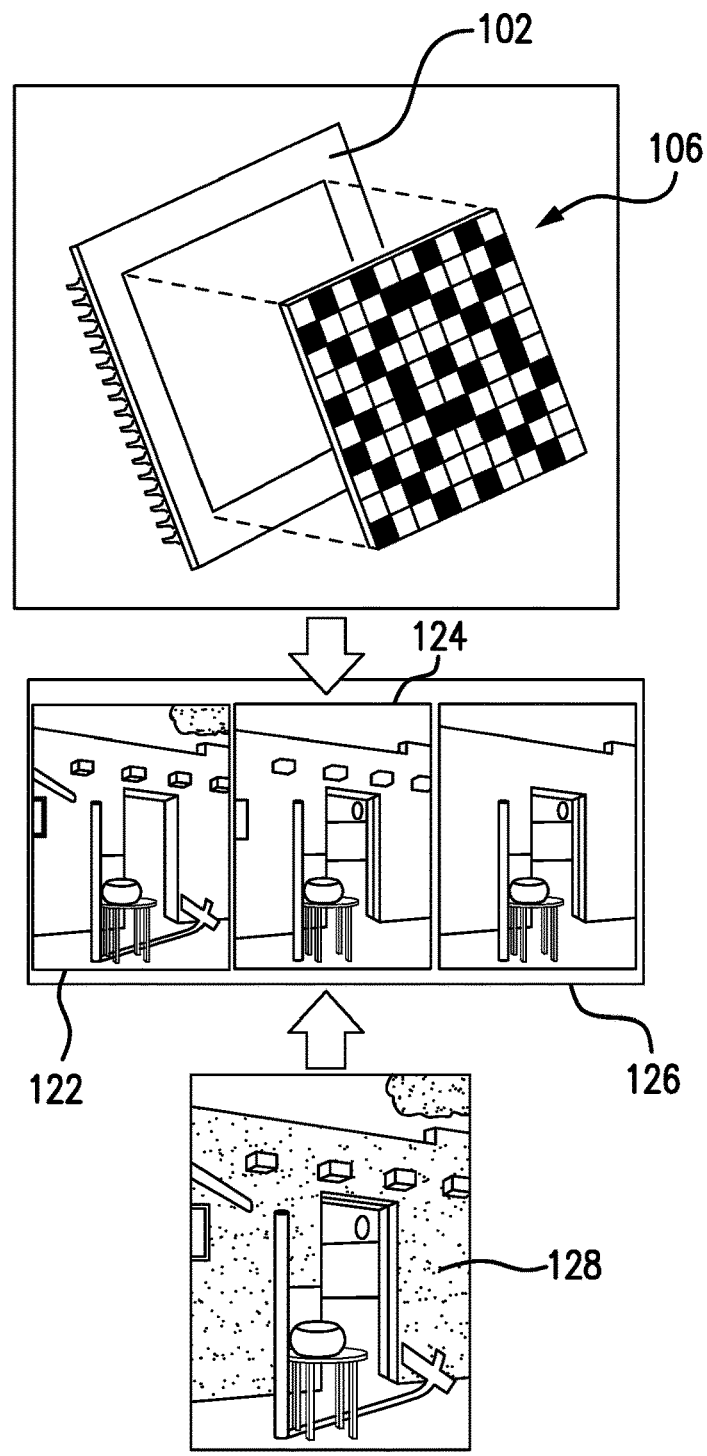
FIG. 4 is schematic view of an imaging method, showing distinct images corresponding to a group of all-pass elements, a group of filter elements filtering according to a first polarization, a second group of filter elements filtering according to a second polarization and a third group of filter elements filtering according to a third polarization.

As shown in FIG. 4, three images 122, 124, and 126 may be reconstructed from three distinct pseudo-random images corresponding to three different polarization filters with shared (constraining) information corresponding to all-pass elements 108 (shown in FIG. 1). Conceptually, an image corresponding to the all-pass elements 128 may be reconstructed and may act as a constraint on the reconstruction of the three images 122, 124, and 126. The reconstruction of images 122, 124, and 126 is more accurate than would otherwise by the case due to the common constraint for each image imposed by the information shared by the three images.

Figure 5A:
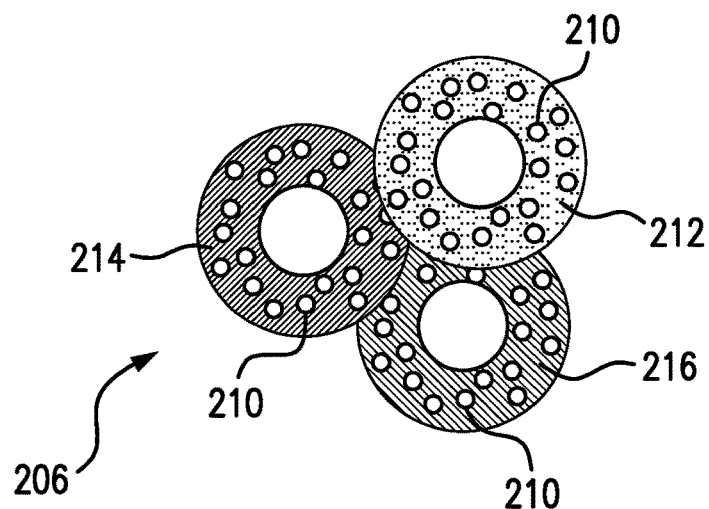
FIGS. 5A and 5B are schematic views of a second embodiment of a mask, showing a time-varying mask.
Figure 5B:
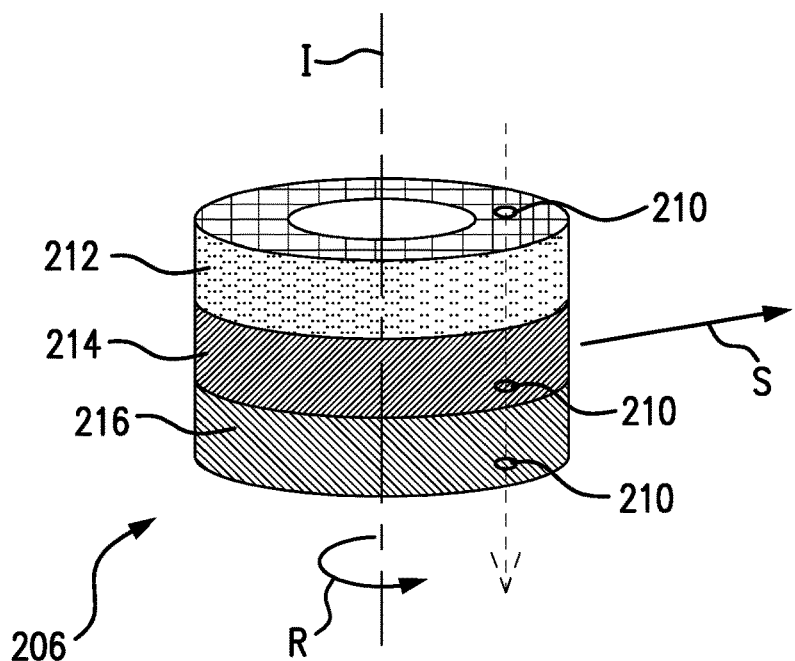

Referring to FIGS. 5A and 5B, a mask 206 is shown. Mask 206 is similar to mask 106 and may be additionally a time-varying mask. In this respect mask 206 includes a first filter element 212 with a plurality of apertures 210, a second filter element 214 is a plurality of apertures 210, and a third filter element 216 with a plurality of apertures 210. Apertures 210 allow received electromagnetic radiation to pass unfiltered through a given filter element, and may traverse each filter element of mask 206 according to the registration of filter elements 212, 214, and 216. As will be appreciated by those of skill in the art in view of the present disclosure, aligned apertures in each filter element form respective all-pass elements within mask 206.

First filter element 212 filters received electromagnetic radiation according to a first quality at locations outside of apertures 210. Electromagnetic radiation received by first filter element 212 at apertures 210 is passed along imaging axis I and towards a sensor array as described above. This can include passing the electromagnetic radiation to second filter element 214, which is axially stacked below (relative to the received electromagnetic radiation) first filter element 212 along imaging axis I, according to the registration of first filter element 212 with second filter element 214.

Second filter element 214 filters received electromagnetic radiation according to a second quality different from the first quality at locations outside of apertures 210. Electromagnetic radiation received by second filter element 214 at apertures 210 is passed along imaging axis I and towards the underlying sensor array. This can include passing the electromagnetic radiation to third filter element 216, which is axially stacked below (relative to the received electromagnetic radiation) second filter element 214 along imaging axis I, according to the registration of second filter element 214 with third filter element 216.

Third filter element 216 filters received electromagnetic radiation according to a third quality, which is different from the first and second qualities, at locations outside of apertures 210. Electromagnetic radiation received by third filter element 216 at apertures 210 is passed along imaging axis I and towards the underlying sensor array.

As electromagnetic radiation is received by mask 206, position of one filter element may be changed relative to the other filter elements. Position can be changed by rotating R the filter element about imaging axis I, as shown in FIG. 5B. Position can be changed by shifting S the filter element relative to the imaging axis I, as also shown in FIG. 5B. Changing the position of one of the filter elements relative to the other filter elements changes the location apertures 210 in relation to the other filter elements and apertures, improving accuracy in image reconstruction by changing over to the location of all-pass information in the images associated with each filter element.

This disclosure creates a pseudo-randomly ordered mask having an array of all-pass and mask elements that selectively filter according polarization level where each pixel of a sensor (e.g., an imaging chip) is covered by one mask element. An image of a natural scene is captured through the mask. The pixels corresponding to a given polarization level are called a pseudo-random image. For each exposure, then, there are several pseudo-random images each corresponding to the pixels of each level, e.g., a first level corresponding to a first polarization and a second level corresponding to a second polarization. From the acquired pseudo-random images, computational methods are used to reconstruct the desired high dynamic range (HDR), high precision, and/or high accuracy image. While this exposition is primarily with respect to multi-polarization reconstruction, the invention applies equally to multispectral imaging, multi-intensity imaging, direction of arrival imaging, and other imaging where the incoming electromagnetic or acoustic waves may be separated by filters.

For polarization imaging, a mask of N discrete different polarization levels is created. There are, therefore, N pseudo-random images for any scene corresponding to N polarizations, each pseudo-random image being related to the other pseudo random images by the information corresponding to the spatial locations of all-pass elements 108. For each exposure, then, there are N pseudo-random images each corresponding to the pixels of one polarization level where one of the levels is all polarizations. For each pseudo-random image (corresponding to each polarization level), there are a limited number of observed pixels (1/N), from which to reconstruct the whole image.

In the exemplary embodiment each pixel of an imaging chip comprising n-by-m pixels is covered by an n-by-m size mask where each pixel of the imaging chip is covered by exactly one mask location and, therefore, one polarization element or one all-pass element. In an alternative embodiment, multiple imaging chip pixels may be covered by one mask location, e.g., if the mask is of size n/2 by m/2. In yet another embodiment, the mask and imaging chip pixels need not be exactly aligned nor adjacent to each other.

The method of generating a pseudo-random mask may vary. In one example, different transparency levels, colors, polarizations, etc. are assigned independently at each mask location and uniformly throughout the mask. In more general case, mask levels can be correlated and uniformly distributed on average. The magnitude of the spatial variation of mask levels in a subset of adjacent locations is the key parameter of a distribution that may control the statistical properties of the mask. This exemplary distribution depends on the number of mask locations in the subset and on a correlation function. Specifically, in the former case of the independently distributed mask levels, the squared magnitude of spatial variation may be directly proportional to the number of mask levels in the subset. In the latter case of correlated distributions this dependence can be modified.

A reconstruction algorithm is then used. One embodiment may use a well-known low-rank matrix completion algorithm. Another is to apply a dictionary learning algorithm for image inpainting. The different qualities of scenes can be reconstructed independently (called independent reconstruction) or, preferably, by joint optimization (called joint reconstruction). The independent reconstruction approach reconstructs each quality of the scene independently, using only responses of the pixels corresponding to one mask level. The joint reconstruction approach reconstructs all qualities of the scene at once, implicitly or explicitly assuming that the structure of the scene qualities are related and using the responses of pixels corresponding to a plurality of mask levels. Independent reconstruction algorithms are well known in the art. The novel joint reconstruction can provide better reconstruction accuracy than independent reconstruction, particularly by adding constraints based on the all-pass elements.

An imaging method employing mask 106 includes receiving electromagnetic radiation, e.g., light, with a plurality of qualities from a scene to be captured at a mask, e.g., mask 106 (shown in FIG. 1). A first portion of the received electromagnetic radiation is passed without filtering through the mask. A second portion of the received electromagnetic radiation is passed through the mask having one or more qualities removed from the light. The all-pass elements are spatially distributed among the plurality of filter elements such that a pseudo-random image is acquired. An image is thereafter reconstructed jointly with the all-pass data as a constraint on the reconstruction, e.g., the sum of separate polarization images must equal the all-pass image.

The methods and systems of the present disclosure, as described above and shown in the drawings, provide for imaging methods, imaging systems, and masks for imaging systems with superior properties including improved accuracy reconstruction of images, e.g., high-dynamic range images, multi-polarization images, and/or multi-spectral images, from filtered images. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An imaging method, comprising:
   receiving electromagnetic radiation with a plurality of qualities from a scene to be captured;
   passing a first portion of the electromagnetic radiation having all of the received plurality of qualities through a mask;
   removing one or more of the plurality of qualities from a second portion of the electromagnetic radiation by passing the second portion of the electromagnetic radiation through the mask;
   removing one or more of the plurality of qualities from a third portion of the electromagnetic radiation by passing the third portion of the electromagnetic radiation through the mask; and
   reconstructing a pseudo-random image using the second and third portions of the electromagnetic radiation constrained by the first portion of the electromagnetic radiation.

2. An imaging method as recited in claim 1, further comprising receiving the first portion of the electromagnetic radiation and the second portion of the electromagnetic radiation at a sensor array optically coupled to the mask.

3. An imaging method as recited in claim 1, further comprising simultaneously passing the first portion of the electromagnetic radiation and the second portion of the electromagnetic radiation through the mask.

4. An imaging method as recited in claim 1, further comprising receiving the first portion of the electromagnetic radiation and the second portion of the electromagnetic radiation at spatially separate portions of a sensor array optically coupled to the mask.

5. An imaging method as recited in claim 1, wherein removing the one or more qualities from the second portion of the electromagnetic radiation includes filtering the received electromagnetic radiation according to a polarization quality.

6. An imaging method as recited in claim 5, wherein the first portion of the electromagnetic radiation passed through the mask includes all polarization qualities of the received electromagnetic radiation.

7. An imaging method as recited in claim 1, wherein removing the one or more qualities from the second portion of the electromagnetic radiation includes filtering the received electromagnetic radiation according to an intensity quality.

8. An imaging method as recited in claim 7, wherein the first portion of the electromagnetic radiation passed through the mask includes all intensity qualities of the received electromagnetic radiation.

9. An imaging method as recited in claim 1, wherein removing the one or more qualities from the second portion of the electromagnetic radiation includes filtering the received electromagnetic radiation according to a spectral quality.

10. An imaging method as recited in claim 9, wherein the first portion of the electromagnetic radiation passed through the mask includes all spectral qualities of the received electromagnetic radiation.

11. A method as recited in claim 1, further comprising shifting the mask relative to the received electromagnetic radiation.

12. A method as recited in claim 1, further comprising rotating the mask relative to the received electromagnetic radiation.

13. An imaging system, comprising:
   a sensor array with a plurality of pixels; and
   a mask optically coupled to the sensor array, wherein the mask comprises a plurality of first mask elements, a plurality of second mask elements, and a plurality of third mask elements,
   wherein the plurality of first mask elements pass all qualities of electromagnetic radiation received at respective first mask elements and are spatially distributed among the plurality of second mask elements and the plurality of third mask elements in a pseudo-random distribution,
   wherein the plurality of second mask elements remove one or more qualities of electromagnetic radiation received at respective second mask elements by passing a second portion of the electromagnetic radiation,
   wherein the plurality of third mask elements remove one or more qualities of electromagnetic radiation received at respective third mask elements by passing a third portion of the electromagnetic radiation, and
   wherein the imaging system reconstructs a pseudo-random image using the second and third portions of the electromagnetic radiation constrained by the electromagnetic radiation passed by the plurality of first mask elements.

14. An imaging system as recited in claim 13, wherein the second mask elements filter according a quality of light selected from polarization, spectral, and intensity.

15. An imaging system as recited in claim 13, wherein the mask includes a plurality of third mask elements, each of the third mask elements removing a quality from received electromagnetic different than that removed from each of the plurality of second mask elements and passed by each of the plurality of first mask elements.

* * * * *